Patented Nov. 29, 1927.

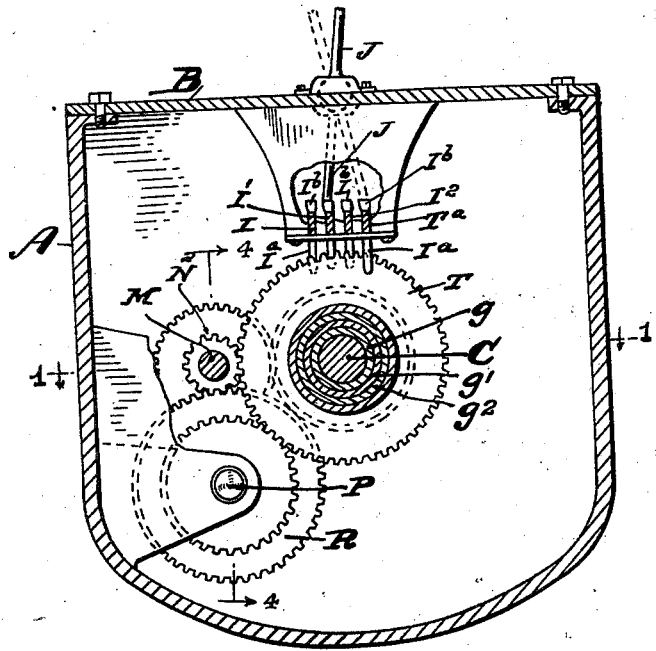
Fig. 3.
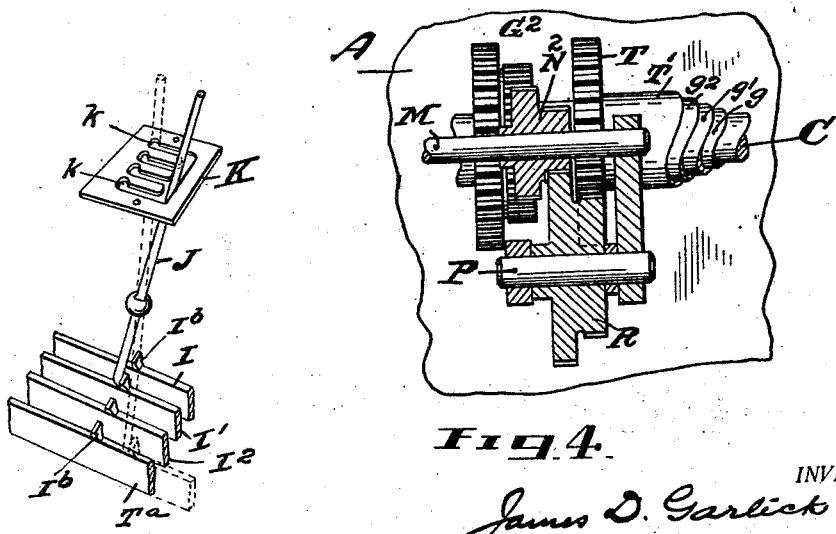
Fig. 4.
Fig. 5.
INVENTOR.
James D. Garlick
BY
S. E. Thomas
ATTORNEY.

1,650,621

UNITED STATES PATENT OFFICE.

JAMES D. GARLICK, OF PORT HURON, MICHIGAN.

TRANSMISSION GEARING FOR MOTOR-DRIVEN VEHICLES.

Application filed November 20, 1926. Serial No. 149,559.

This invention relates to a transmission gearing for motor driven vehicles shown in the accompanying drawings and more particularly described in the following specification and claims.

The invention comprises a plurality of stepped gears housed in a casing through which the driving shaft of a motor vehicle extends. Each of the gears are integral with one end of a plurality of telescoping sleeves mounted upon the driving shaft and at their opposite ends are respectively provided with cone-shaped discs of relatively different diameters which when longitudinally shifted upon the driving shaft alternately engage an annular cone-shaped clutch member bolted to an extension sleeve of a propeller shaft connected with the propeller shaft of the motor by a universal joint—not shown.

The several stepped gears and their integral sleeves—telescopically mounted upon the driving shaft—are constantly coupled with a plurality of stepped idler gears mounted on a countershaft to effect through the clutch the desired changes of speed in the propeller shaft which may be obtained by longitudinally shifting the gears on the driving shaft so that the respective cone-shaped discs may alternately engage the cone clutch member attached to the extension of the propeller shaft,—the gears being adapted for longitudinal movement on the driving shaft are shifted by a manually operated lever,—forcing the selected cone-shaped disc of the clutch to engage the co-operating clutch member secured to the extension of the propeller shaft.

The primary object of the present invention therefore is to effect a change of speeds easily and quietly through a slight shifting of constantly intermeshing gears—thus eliminating the noise resulting from the clashing of gears when shifted from a disconnected to an interlocking relation.

With the foregoing and other objects in view which will appear as the description proceeds, the invention further resides in the details of construction hereinafter described and claimed, it being understood that changes may be made in the precise embodiment of the invention herein disclosed without departing from the spirit of the same.

In the drawings accompanying this specification:

Figure 3 is a vertical cross-sectional view taken on or about line 3—3 of Figure 1.

Figure 4 is a fragmentary vertical longitudinal sectional view taken on or about line 4—4 of Figure 3 showing the reversing gears.

Figure 5 is a fragmentary diagrammatic perspective view showing a manually operated gear shift lever and bars controlling the longitudinal movement of the forward speed and reverse gears, also a notched floor plate for locking the gear shift lever when actuated.

Figure 1:
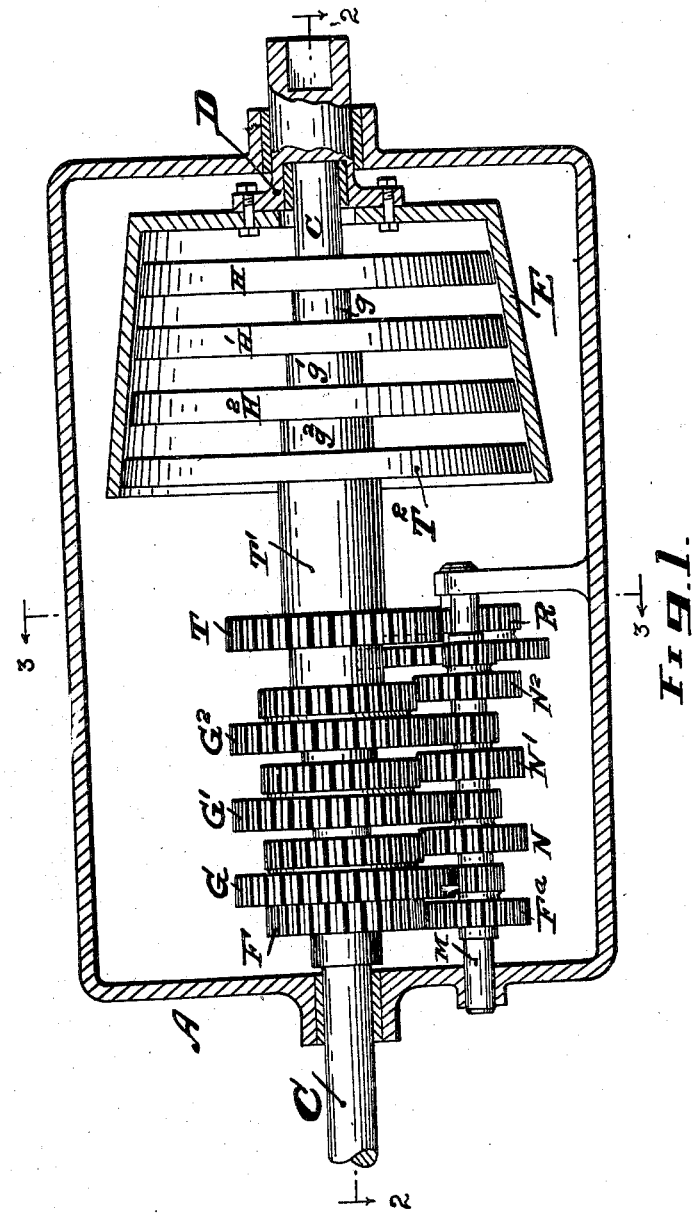
Figure 1 is a horizontal sectional view on or about line 1—1 of Figure 3.
Figure 2:
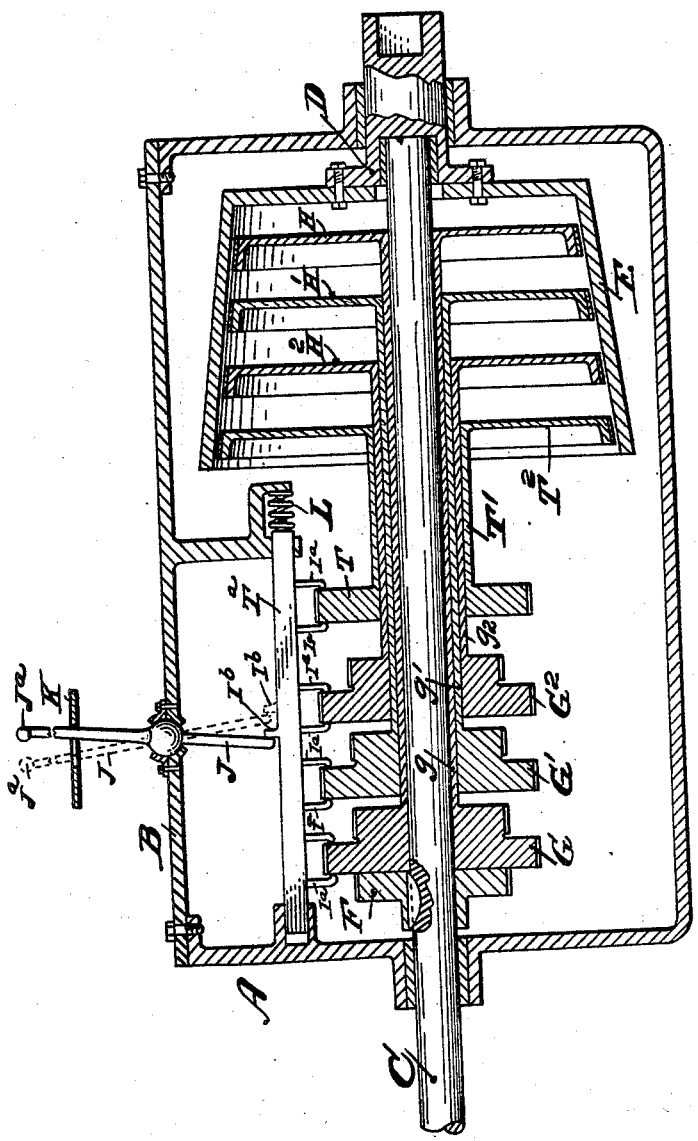
Figure 2 is a longitudinal vertical sectional view taken on or about line 2—2 of Figure 1.

Referring now to the letters of reference placed upon the drawings:

A denotes a gear case adapted to be secured to the frame of a motor vehicle—not shown. B indicates its cover plate, C the driving shaft of an engine—not shown—the driving shaft C being journalled at one end in a flange sleeve D which is in turn journalled in the wall of the gear case. Bolted to the flange of the sleeve D within the gear case is an annular cone-clutch member E, the end of the sleeve projecting through the wall of the gear case being connected by a universal joint—not shown—with a propeller shaft of usual construction. F is a driving gear keyed to the driving shaft and $G$, $G^1$, $G^2$ are stepped gears loosely sleeved upon the driving shaft, the respective gears being integral with the sleeves $g$, $g^1$, $g^2$ concentrically and telescopically arranged upon the driving shaft. The opposite end of the several sleeves support cone-shaped discs $H$, $H^1$, $H^2$ of relatively different diameters and severally adapted to be forced into impinging contact with the inner surface of the annular cone clutch member E.

$I$, $I^1$, $I^2$, and $T^a$ are shifting bars supported in the frame of the gear case, each of which is provided with a pair of depending fingers $I^a$ $I^a$ respectively overlapping each side of the stepped gears $G$, $G^1$, $G^2$ and reverse gear T on the driving shaft. Projecting upwardly from each of the shifting bars is a lug $I^b$ adapted to be engaged by a manually operated gear shift lever J pivoted in the upper wall of the gear case and extending through a slotted floor plate K,—the lever terminating above in the usual ball handle $J^a$ for convenience in operating the lever to shift the gears.

Supported at the end of each of the shifting bars by a bracket depending from the cover of the gear case is shown one of a plurality of springs L, respectively adapted to return the shifting bars to their initial position following the release of the lever J. On a plane with the driving shaft and supported by the wall of the casing is a countershaft M on which is loosely sleeved a stepped gear $F^a$ in mesh with the driving gear F—also a plurality keyed to the driving shaft—also a plurality of stepped gears N, $N^1$, $N^2$ respectively in mesh with the stepped gears G, $G^1$, $G^2$ sleeved on the driving shaft.

On a second countershaft P located below the countershaft M is mounted a stepped gear R in mesh with the pinion or the smaller of the stepped gears $N^2$ on the countershaft M, and also with the reversing gear T integral through its hub sleeve $T^1$ with the friction disc $T^2$. The larger stepped gear $N^2$ on the countershaft M, meshes with the smaller gear or pinion of the stepped gear $G^2$ on the driving shaft.

Having indicated the several parts by reference letters, the construction and operation of the device will be readily understood.

Any desired number of stepped change gears may be mounted upon the driving shaft and coupled with idler gears on the countershaft to effect through the clutch mechanism any desired or predetermined speed of the propeller shaft.

It will be readily perceived however that instead of the cone clutch shown in the drawings, any suitable clutch mechanism controllable by shifting the speed transmission gearing may be employed. So also while a plurality of gear shifting bars and a manually actuated lever for shifting the several bars is diagrammatically indicated, any other suitable manually operated shift mechanism may be employed,—that disclosed by the present embodiment being merely a means for accomplishing the desired result.

In Figure 5 the shifting bars and the lever for manually operating the same are shown in full lines in "neutral position," and in dotted lines one of the bars is shown shifted by the lever,—which is locked in the notch $k$ in the floor plate K, to remain in this locked position until manually released.

In Figure 1 the several cone-shaped discs H, $H^1$, $H^2$, $T^2$ are shown released from the annular cone clutch member E,—all being indicated in "neutral position."

We will now assume that the driver of the car desires to start at low speed in a forward direction. The manual gear shift lever J is actuated so that its lower end engages the lug $I^b$ of the shifting bar $I^2$ and the depending fingers $I^a$ $I^a$ of the latter engaging the sides of the stepped gear $G^2$, causes the latter to move longitudinally a short distance so that the cone-shaped disc $H^2$ carried by the sleeve of said gear may be forced into impinging contact with the annular cone clutch member E, and as the idler gears G, $G^1$, $G^2$ intermesh with the gears $F^a$, N, $N^1$, $N^2$ on the countershaft M, the propeller shaft is actuated at predetermined and a relatively lower speed ratio than the driving shaft. To increase the speed, the operator first releases the shifting lever J, whereupon the spring L at the end of the shifting bar $I^2$ forces it back to its neutral position. The operator then engages the shifting bar $I^1$ controlling the next speed gear,—and so on in like manner until the propeller shaft of the vehicle is rotating at the desired speed.

To drive the car in a reverse direction the gear T is shifted by the controlling lever J forcing the clutch disc $T^2$ into engagement with the cone clutch member E, then through the stepped gear R on the countershaft P in mesh with the gear T on the driving shaft and pinion of the stepped gear $N^2$ on the countershaft M in mesh with the pinion of the stepped gear $G^2$ on the driving shaft the rotation of the propeller shaft is reversed.

The gear shifting mechanism is shown diagrammaticaly, as the particular mechanism to be employed will later form the subject matter of another application for patent.

Having thus described my invention what I claim is:

1. In a device of the character described, a driving shaft; a driving gear keyed to the driving shaft; a plurality of stepped gears sleeved on the driving shaft, each having a limited longitudinal movement; a countershaft; a plurality of stepped gears loosely mounted upon the countershaft, one of said stepped gears being in mesh with the driving gear, said last named stepped gear and also the other stepped gears on the countershaft being respectively in mesh with the stepped gears on the driving shaft; a propeller shaft; a clutch member carried by the propeller shaft; clutch members carried by the gears sleeved on the driving shaft respectively adapted to co-ordinate with the clutch member carried by the propeller shaft; whereby upon longitudinally and alternately shifting the gears sleeved on the driving shaft, changes in the speed of the propeller shaft may be effected; and means for manually shifting said gears sleeved on the driving shaft.

2. In a device of the character described, a driving shaft; a driving gear keyed to the driving shaft; a countershaft; a plurality of stepped gears loosely mounted upon the countershaft, one of said gears being in mesh with the driving gear on the driving shaft; a propeller shaft; a clutch member carried by the propeller shaft; a plurality of stepped gears sleeved on the driving shaft respectively in mesh with the stepped gears on the countershaft, said gears on the driving shaft having a longitudinal movement less than the width of the gears on the countershaft, whereby they remain continuously in mesh with the respective gears of the countershaft; clutch members carried by the gears sleeved on the driving shaft respectively adapted to co-ordinate with the clutch member carried by the propeller shaft to effect changes in the speed of the propeller shaft; and means for manually shifting the gears sleeved on the driving shaft, whereby the clutch members carried by said gears may alternately and severally engage the clutch member of the propeller shaft.

3. In a device of the character described, a driving shaft; a driving gear keyed to the driving shaft; a countershaft; a plurality of stepped gears loosely mounted upon the countershaft, one of said gears being in mesh with the driving gear on the driving shaft; a propeller shaft; a clutch member carried by the propeller shaft; a plurality of gears sleeved on the driving shaft respectively in mesh with the stepped gears on the countershaft, said gears on the driving shaft having a limited longitudinal movement less than the width of the gears on the countershaft, whereby they remain continuously in mesh with the respective gears of the countershaft; clutch members carried by the gears sleeved on the driving shaft respectively adapted to co-ordinate with the clutch member carried by the propeller shaft to effect changes in the speed or to reverse the direction of the propeller shaft; and means for manually shifting the gears sleeved on the driving shaft, whereby the clutch members carried by said gears may alternately and severally engage the clutch member of the propeller shaft.

4. In a device of the character described, a driving shaft; a driving gear keyed to the driving shaft; a plurality of gears sleeved on the driving shaft, each having a limited longitudinal movement; a countershaft; a plurality of stepped gears loosely mounted upon the countershaft, one of said stepped gears being in mesh with the driving gear, said last named stepped gear and also the other stepped gears on the countershaft being respectively in mesh with the stepped gears on the driving shaft; a propeller shaft; a clutch member carried by the propeller shaft; clutch members carried by the gears sleeved on the driving shaft respectively adapted to co-ordinate with the clutch member carried by the propeller shaft; a second countershaft; a stepped gear mounted on the last named countershaft in mesh with one of the sleeved gears on the driving shaft fitted with a clutch member adapted to engage the clutch member of the propeller shaft when longitudinally shifted, said stepped gear on the second countershaft being also in mesh with one of the stepped gears of the first named countershaft, in turn in mesh with one of the stepped gears on the driving shaft, whereby upon longitudinally shifting the last named clutch member into engagement with the clutch member carried on the propeller shaft, the rotation of the propeller shaft may be reversed; and means for longitudinally shifting the respective stepped gears with their clutch members on the driving shaft.

5. In a device of the character described, a driving shaft; a driving gear keyed to the driving shaft; a plurality of stepped gears sleeved upon the driving shaft, each having an independent and limited longitudinal movement; a countershaft; a plurality of stepped gears loosely mounted upon the countershaft and respectively in mesh with the gears sleeved on the driving shaft, one of the gears of the countershaft being also in mesh with the driving gear; a propeller shaft; a clutch member carried by the propeller shaft; clutch members respectively carried by a plurality of telescoping sleeves concentric to the driving shaft and severally integral with the respective gears sleeved on the driving shaft, said clutch members being severally adapted to alternately co-ordinate with the clutch member carried by the propeller shaft; and means for manually and severally shifting said clutch members into co-operating relation with the clutch member of the propeller shaft.

In testimony whereof, I sign this specification.

JAMES D. GARLICK.